US012226357B2

(12) United States Patent
Schwarer

(10) Patent No.: US 12,226,357 B2
(45) Date of Patent: Feb. 18, 2025

(54) PRESSURE APPLICATOR ASSEMBLY FOR EXERCISE AND REHABILITATION

(71) Applicant: BODY ORGANICS PTY LTD, Brisbane (AU)

(72) Inventor: Michael Edward Schwarer, Brisbane (AU)

(73) Assignee: BODY ORGANICS PTY LTD, Brisbane (AU)

( * ) Notice: Subject to any disclaimer, the term of this patent is extended or adjusted under 35 U.S.C. 154(b) by 954 days.

(21) Appl. No.: 16/980,698

(22) PCT Filed: Mar. 12, 2019

(86) PCT No.: PCT/AU2019/050222
§ 371 (c)(1),
(2) Date: Sep. 14, 2020

(87) PCT Pub. No.: WO2019/173868
PCT Pub. Date: Sep. 19, 2019

(65) Prior Publication Data

US 2021/0007923 A1 Jan. 14, 2021

(30) Foreign Application Priority Data

Mar. 13, 2018 (AU) ................................ 2018900820

(51) Int. Cl.
*A61H 1/00* (2006.01)
*A61H 7/00* (2006.01)

(52) U.S. Cl.
CPC ............. *A61H 1/008* (2013.01); *A61H 1/006* (2013.01); *A61H 7/001* (2013.01);
(Continued)

(58) Field of Classification Search
CPC ............ A61H 1/008; A61H 2201/0107; A61H 2201/0126; A61H 2201/1261;
(Continued)

(56) References Cited

U.S. PATENT DOCUMENTS 243,362 A * 6/1881 Crandall ................ G09B 17/00 446/69
784,888 A * 3/1905 Reisner .................... A63H 3/00 D21/595
(Continued)

FOREIGN PATENT DOCUMENTS

CN 105943350 A 9/2016
DE 202008016657 U1 3/2009
GB 404853 A 1/1934

OTHER PUBLICATIONS

"What is the difference between 'Ferromagnetic' and 'Magnetic'?", Auris (Year: 2023).*
(Continued)

*Primary Examiner* — Colin W Stuart
(74) *Attorney, Agent, or Firm* — Workman Nydegger

(57) ABSTRACT

A pressure applicator assembly is configured to allow for a range of pressure application and pressure localisation options along with the ability to have a rocker base for directing the applied pressure to a subject in a particular direction if desired. The assembly includes dome shaped resilient members that nest together and which each include magnets for magnetic fixation to a surface of a base. Due to the nesting of the resilient members the degree of firmness and/or the radius of curvature and thus the degree of localisation of application of force can be varied by adding or removing resilient members. In addition, the magnets allow the resilient members to be rapidly fixed to any magnetically attracted surface so that they can be used in horizontal, vertical or sloping orientations. Furthermore, the
(Continued)

apparatus is readily stored and transported since it can be placed into the compact nested configuration as required.

20 Claims, 8 Drawing Sheets

(52) U.S. Cl.
CPC ................ *A61H 2201/0107* (2013.01); *A61H 2201/0126* (2013.01); *A61H 2201/0153* (2013.01); *A61H 2201/0157* (2013.01); *A61H 2201/0161* (2013.01); *A61H 2201/1253* (2013.01); *A61H 2201/1261* (2013.01); *A61H 2201/168* (2013.01); *A61H 2201/1685* (2013.01); *A61H 2201/1695* (2013.01)

(58) Field of Classification Search
CPC .... A61H 2201/1695; A61H 2015/0042; A61H 7/001; A61H 2201/0161; A61H 2201/1253; A61H 2201/1284; A61H 2201/1685; A61H 2201/0119; A61H 2201/0192; A61H 1/006; A61H 7/007; A61H 15/0092; A61H 23/06; A61H 2201/0123; A61H 2201/0153; A61H 2201/0157; A61H 2201/1676; A61H 2201/168; A61H 7/00; A61H 7/002; A61H 7/003; A61H 15/00; A61H 2015/0007; A61H 2015/0064; A61H 39/00; A61H 39/04; A63B 21/075; A63B 23/1236
USPC ........................................ 601/1; 446/69, 486
See application file for complete search history.

(56) References Cited

U.S. PATENT DOCUMENTS

| | | | | | |
|---|---|---|---|---|---|
| 2,496,093 | A * | 1/1950 | Iwata | B65D 21/0223 | 206/509 |
| 2,814,159 | A * | 11/1957 | Green | A63H 33/06 | 446/69 |
| 2,949,692 | A * | 8/1960 | Kuhn | A63H 33/06 | 446/124 |
| 4,126,129 | A * | 11/1978 | Rainbow | A61H 1/00 | 601/134 |
| 5,127,652 | A * | 7/1992 | Unger | A63F 9/0278 | 446/419 |
| 5,902,258 | A * | 5/1999 | Cziriak | A61H 7/001 | 601/134 |
| 6,007,501 | A * | 12/1999 | Cabados | A61H 39/04 | 601/134 |
| 6,093,159 | A * | 7/2000 | Racoosin | A61H 15/0092 | 601/118 |
| 7,156,817 | B1 * | 1/2007 | Cassidy Phillips | A61H 15/0092 | 601/134 |
| 10,130,549 | B2 * | 11/2018 | Balducci | A61H 15/00 | |
| 2003/0125174 | A1 * | 7/2003 | Lin | A63B 21/154 | 482/148 |
| 2004/0142801 | A1 * | 7/2004 | Lin | A63B 21/0552 | 482/142 |
| 2007/0117698 | A1 * | 5/2007 | Adamson | A61H 1/0296 | 482/148 |
| 2009/0105620 | A1 * | 4/2009 | Wolfe | A61H 7/001 | 601/135 |
| 2010/0087763 | A1 * | 4/2010 | Hane-Karr | A61H 15/0092 | 601/137 |
| 2012/0059405 | A1 * | 3/2012 | Reynolds | A61H 23/02 | 606/204 |
| 2012/0222192 | A1 * | 9/2012 | Carey | A61F 7/02 | 2/171.2 |
| 2013/0137555 | A1 * | 5/2013 | Hodes | A63B 21/075 | 482/106 |
| 2013/0217545 | A1 * | 8/2013 | Orenstein | A63B 23/0458 | 482/52 |
| 2014/0194258 | A1 * | 7/2014 | Shorter | A63B 21/072 | 482/93 |
| 2014/0228723 | A1 * | 8/2014 | Cockerill | A61H 15/0092 | 601/128 |
| 2014/0336616 | A1 * | 11/2014 | Edwards | A61N 2/002 | 604/173 |
| 2015/0126915 | A1 * | 5/2015 | Reynolds | A61H 1/008 | 601/134 |
| 2015/0223970 | A1 * | 8/2015 | Holland | A63B 21/0004 | 601/19 |
| 2016/0095781 | A1 * | 4/2016 | Hudson | A61H 7/001 | 601/136 |
| 2017/0106249 | A1 * | 4/2017 | Marton | A63B 21/00178 | |
| 2017/0231851 | A1 * | 8/2017 | Faussett | A61H 7/001 | 601/135 |
| 2018/0055719 | A1 * | 3/2018 | Maichel | A61H 7/002 | |
| 2018/0104144 | A1 * | 4/2018 | Faussett | A61H 39/06 | |
| 2019/0046392 | A1 * | 2/2019 | Evans | A61H 1/00 | |

OTHER PUBLICATIONS

International Search Report and Written Opinion from PCT Application No. PCT/AU2019/050222, Mar. 29, 2019.
Search Report for corresponding Australian Application No. 2018900820, Feb. 26, 2019.

* cited by examiner

PRESSURE APPLICATOR ASSEMBLY FOR EXERCISE AND REHABILITATION

TECHNICAL FIELD

The present invention concerns a pressure applicator assembly to assist in applying pressure to points of the human body.

BACKGROUND ART

Any references to methods, apparatus or documents of the prior art are not to be taken as constituting any evidence or admission that they formed, or form part of the common general knowledge.

It is known to use various apparatus to apply pressure to areas of the human body for the purpose of releasing muscular tension and pain relief. Such apparatus come in a number of forms. For example trigger point balls and massage balls are known. However trigger point balls and massage balls tend to roll about and are generally best used in applications where they are placed on a horizontal surface. It is possible to use such balls with the user vertical and with the balls placed between the user and a vertical surface but doing so is often inconvenient because it is a delicate operation to place the balls precisely and of course there is a risk of the balls falling. To address these issues it has been known to use massage apparatus that include ropes or straps for strapping to the user's body or alternatively to provide the apparatus with suction cups so that it can be held by suction to a smooth surface. Both of these approaches have drawbacks, for example applying the straps can be time consuming and fiddly. The suction cups tend to wear and may mark the surface to which they're applied, which is undesirable and furthermore a smooth surface that is suitable for attachment of the suction cups may not be available in the local area.

It will be realized that it would be advantageous if a degree of firmness of the apparatus could be varied. This is because the apparatus may be used on different areas of the body, which are receptive to a greater or lesser degree of firmness and also with different persons who have different body tones and different requirements. A solution to this problem that is available from some providers of such apparatus is to supply a range of products, all having the same shape and dimension but varying in firmness, for example, "soft", "medium", "hard" and "extra hard" versions of the same shaped apparatus may be provided. Such a solution requires that consumers need to keep multiple products for different body areas and suppliers are required to maintain more inventory than would otherwise be the case. It would be advantageous if a pressure applicator assembly for exercise and rehabilitation were provided that was able to offer a number of different degrees of firmness.

It will also be appreciated that depending on the area of the body and the subject to whom pressure is to be applied by means of the apparatus, an apparatus with a smaller or larger radius of curvature may be best suited so that more or less pressure can be applied to the subject with the same degree of force. It would be advantageous if a single apparatus could be provided that was capable of allowing a user selection of the radius of curvature that would be applied to the subject. If a single apparatus could be provided then the problem of having to keep, and transport, a number of different versions of the apparatus could be avoided.

It is an object of the present invention to provide a pressure applicator assembly for applying pressure to a subject, for the purpose of exercise and/or muscular rehabilitation, that takes into account the problems of the prior art that have been discussed.

SUMMARY OF THE INVENTION

A pressure applicator assembly including:

a plurality of resilient nested members, each of said members having an outer surface for applying force to a subject whereby firmness of an outermost surface of the assembly is adjustable by removal or addition of one or more of said nested members; and each of the resilient nested members includes one or more magnetic regions for attachment to a base;

wherein said members may be located as desired on the base by magnetic attraction between the magnetic regions and one or more magnetically attracted regions of the base.

Preferably the assembly includes the base in combination with the plurality of resilient nested members wherein the one or more magnetically attracted regions of the base comprise one or more regions of ferromagnetic material such as steel.

Preferably the one or more regions of ferromagnetic material comprises a steel plate.

The base may further comprise a rocker to which the steel plate is adhered. For example the rocker may comprise a disk having an inner side to which the steel plate is mounted and a convex outer side for contact against a weight bearing surface.

In a preferred embodiment of the invention the inner side includes a peripheral lip which surrounds the steel plate and which is dimensioned to snugly receive an outer periphery of an outermost one of the plurality of resilient nested members.

In a preferred embodiment of the invention the one or more magnetic regions comprise a number of magnets such as disk magnets. Preferably the disk magnets are held in pockets integrally formed in inner sides of each of the resilient nested members.

In a preferred embodiment of the invention each of the resilient nested members includes integrally formed covers for the pockets.

It is preferred that each of the resilient nested members has an inner side that is reinforced. For example each of the resilient nested members may have an inner side that includes reinforcement ribs.

In a preferred embodiment of the invention each of the resilient members is dome shaped. Preferably each of the resilient members, other than the innermost one, has ribs with inner sides that are arcuate and concentric with the resilient member's outer side, wherein outer sides of non-outermost resilient members abut inner sides of ribs of the next outermost member to thereby increase the firmness of the a next outer member.

In a preferred embodiment of the invention each of the resilient members has a height that is about 90% of a radius of a base of the dome.

It is preferred that adjacent resilient members include formations for detachable engagement therebetween.

In a preferred embodiment of the present invention the formations include corresponding protrusions and recesses formed on respective outer and inner peripheries of the adjacent resilient members whereby urging the adjacent resilient members into a nested position causes sufficient deformation for the protrusions to be received into the recesses.

Preferably the ribs are formed with one or more access cut-outs for assisting a user to gain purchase on an inner one of the adjacent resilient members to thereby overcome engagement force between the protrusions and the under-cuts. In a preferred embodiment of the invention the opposed sides of the access cut-outs are arcuate to complement the sides of a user's finger.

In a preferred embodiment of the invention the plurality of resilient nested members comprise an inner nested member, an intermediate nested member and an outer nested member.

According to a further aspect of the present invention there is provided a pressure applicator assembly including:

a plurality of resilient nested members, each of said members having an outer surface for applying force to a subject whereby firmness of an outermost surface of the assembly is adjustable by removal or addition of one or more of said nested members and at least an outermost one of the resilient nested members includes one or more magnetic regions for attachment to a base;

wherein said members may be located as desired on the base by magnetic attraction between the magnetic regions and one or more magnetically attracted regions of the base.

Preferably each of the resilient nested members includes the one or more magnetic regions for attachment to the base.

In another aspect of the present invention there is provided a pressure applicator assembly including:

a plurality of resilient nested members, each of said members having an outer surface for applying force to a subject whereby firmness of an outermost surface of the assembly is adjustable by removal or addition of one or more of said nested members; wherein each of the resilient nested members including one or more magnetic regions for attachment to a magnetically attracted base.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

In the following description a number of exemplary embodiments of the invention will be discussed. Throughout the discussion like components and features may be identified from embodiment to embodiment with the same identifier numerals in the figures.

Figure 1:
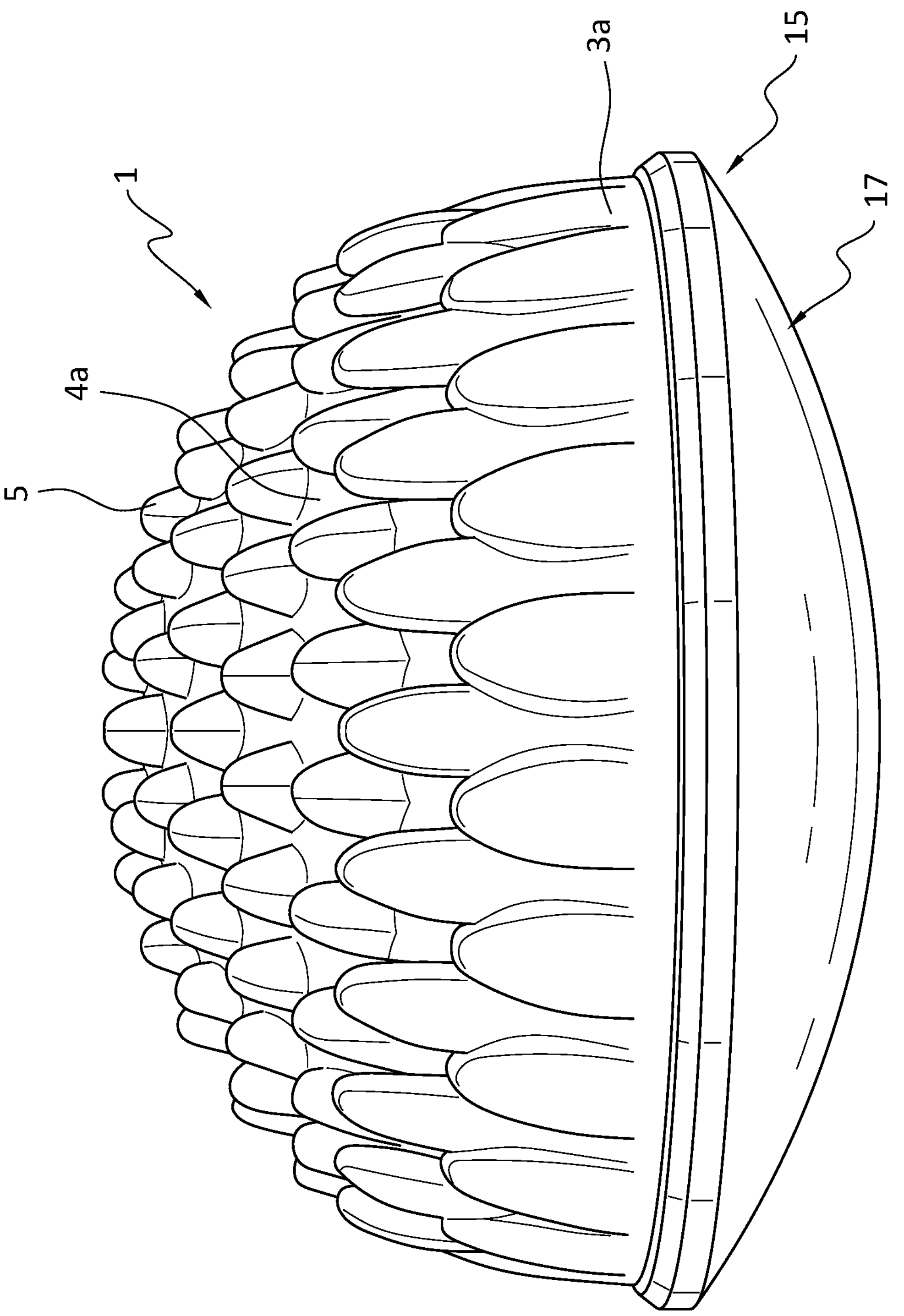
FIG. 1 illustrates a pressure applicator assembly according to a preferred embodiment of the invention depicted in an assembled configuration.
Figure 2:
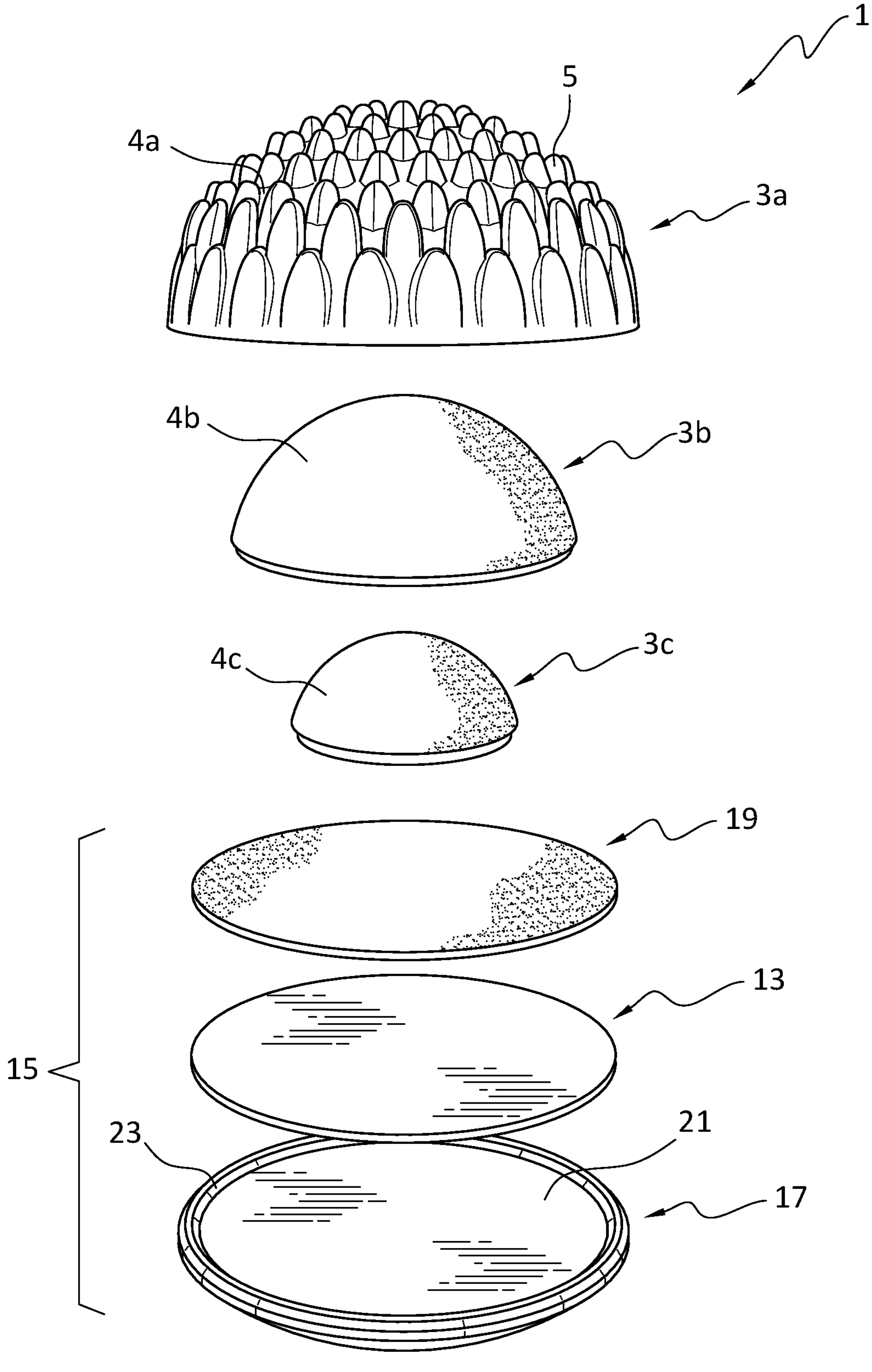
FIG. 2 is an exploded view of the pressure applicator assembly of FIG. 1.

FIG. 1 is a side view of a pressure applicator assembly 1 according to a preferred embodiment of the present invention whereas FIG. 2 is an exploded view of the pressure applicator assembly 1.

Pressure applicator assembly 1 is comprised of a plurality of resilient nested members 3*a*, which is the outermost member, 3*b* which is an intermediate member, and 3*c* which is an innermost member.

It will be realized that in other embodiments of the invention more than three resilient members may be provided and furthermore in an alternative embodiment of the invention the apparatus may have only two resilient members, i.e. an inner and an outer member with no intermediate member.

In the presently described preferred embodiment of the invention the resilient nested members 3*a*, 3*b*, 3*c* are shaped as domes with outer convex dome surfaces 4*a*, 4*b* and 4*c*. However it should be realized that in other embodiments of the invention they may have other shapes that are suitable for providing therapeutic pressure to a human body. The outermost dome 3*a* has an outer surface 4*a* that is formed with a number of projections 5 for applying discrete regions of pressure to the subject in use.

The resilient members 3*a*, 3*b*, 3*c* are provided mounted upon base 15 and are attracted thereto and fixed in place by virtue of them each having magnets that are attracted to a magnetically attracted region of the base comprising a ferromagnetic material in the form of a galvanized steel plate 13 that is part of the base 15.

With reference again to FIG. 2, the base 15 comprises the galvanized steel plate 13 which is adhered or otherwise fastened to a rocker 17. The rocker 17 comprises a disk having an inner side to which the steel plate 13 is adhered or otherwise mounted and a convex outer side for contact against a weight bearing surface such as a floor or wall. The base may be other than disk shaped, for example it could be square or rectangular or any other desired shape. A non slip mat 19 covers the galvanized steel plate 13. The galvanized steel plate 13 and the non-slip mat 19 are snugly received within a circular recess 21 formed into the inner side of the rocker 17 and defined by a peripheral lip 23 around the outside of the inner side of the rocker. The lip 23 is dimensioned to complement an outer periphery of the outermost one of the plurality of resilient nested members, i.e. member 3*a* in FIG. 2.

Figure 4:
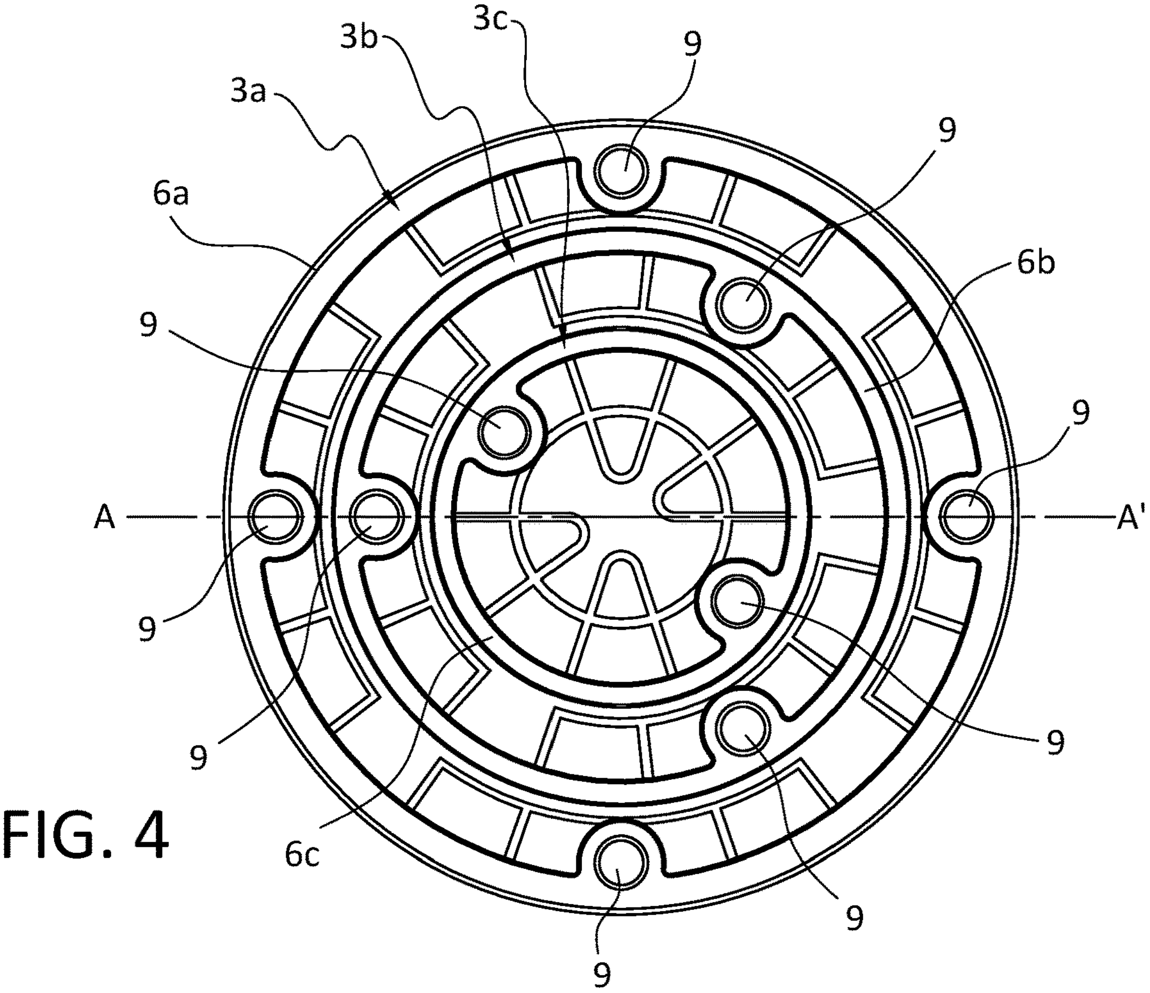
FIG. 4 is an assembled view of the underside of the three resilient members of FIG. 3 including base attachment magnets.
Figure 5:
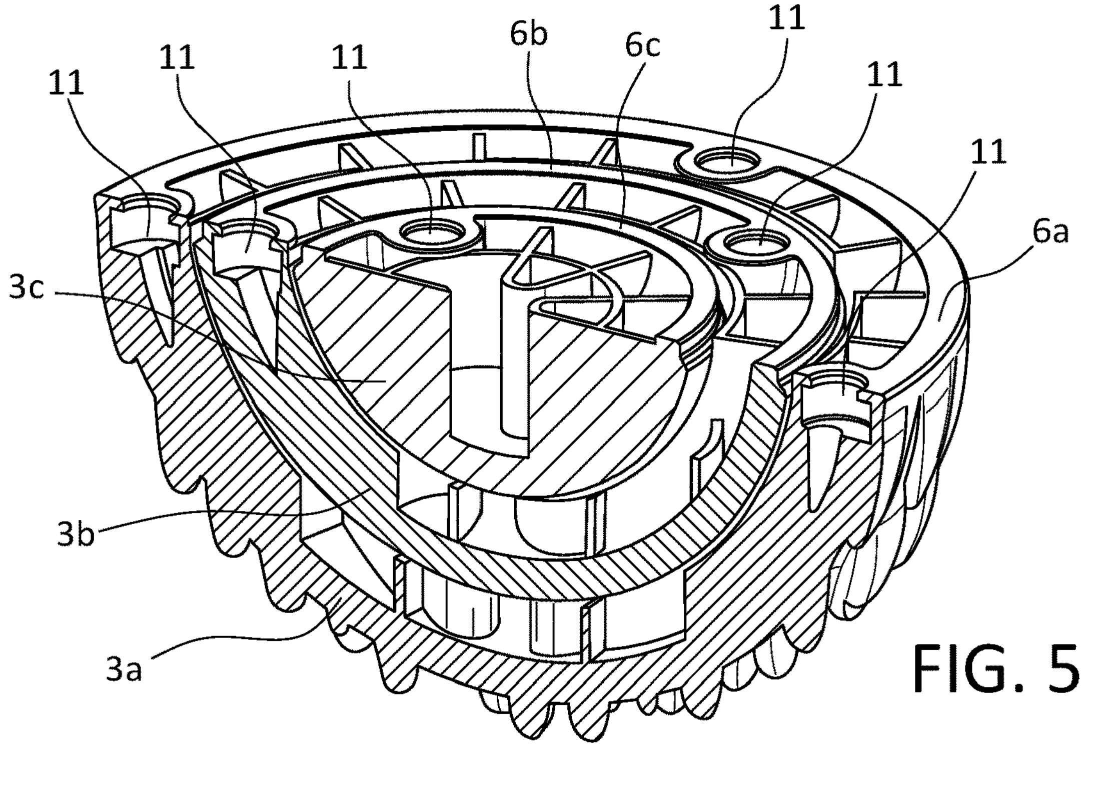
FIG. 5 is a cross-section through the three resilient members of FIG. 4 along the line A-A' with the magnets not shown.

FIG. 4 is an assembly view of the underside of the resilient nested members 3*a*, 3*b*, 3*c* wherein it can be see that each of the members 3*a*, 3*b*, 3*c* includes attachment means in the form of magnets 9. FIG. 5 shows a cross sectional view taken along the line A-A' of FIG. 4 in which the magnets are not shown.

The magnets 9 may be seen in FIG. 4, and are each contained within pockets 11, best seen in FIG. 5. Each of the resilient members 3*a*, 3*b*, 3*c* is preferably made of a thermoplastic elastomer material by injection molding after which the magnets 9 are inserted into the pockets 11. In other embodiments of the invention the magnets 9 are embedded within the resilient member at the time of the injection molding so that the magnets are not visible when viewing the underside of the resilient member.

With reference again to FIG. 3, it is preferred that each of the resilient nested members has an inner side that is reinforced. As it may be seen each of the resilient nested members 3*a*, 3*b*, 3*c* have an inner side that includes reinforcement ribs 25*a*, 25*b*, 25*c*. The ribs are designed to add structure and firmness to their associated member whilst allowing for a degree of softness and bounce.

Each of the resilient members 3*a*, 3*b* has ribs 25*a*, 25*b* with inner sides that are arcuate and with a profile that is shaped to complement an outer side, i.e. surfaces 4*b* and 4*c* of the next inner nested members 3*b* and 3*c* respectively.

For example, the outer side of resilient member 3*c* abuts the inner sides of ribs 25*b* of the next outermost member 3*b*. Similarly, the outer side of resilient member 3*b* abuts the inner sides of ribs 25*a* of the next outermost member 3*a*. It will be realized that as more or less of the resilient members are nested together the firmness of the outer surface of the outermost one of the nested members increases or decreases.

The term“nested” includes an arrangement by which at least a part of an outer surface of the intermediate member 3*b* fits within at least a part of the outermost member 3*a* and similarly at least a part of the innermost member 3*c* fits within a part of the intermediate member 3*b*. In the present instance each of the resilient nested members 3*a*, 3*b*, 3*c* are dome shaped with an inner, concavity of the outer member 3*a* demarcated by stiffening ribs 25*a* that complement an outer, convex side of intermediate member 3*b* and similarly, an inner concavity of the intermediate member 3*b* demarcated by stiffening rings 25*b* complements an outer convex side of the innermost member 3*c*. In the presently described embodiments of the invention when the resilient members are nested together as shown in cross section in FIG. 5 for example, the outer peripheries of each of the resilient members are substantially coplanar so that they can simultaneously sit upon a flat surface such as base 15 as shown in FIG. 1.

Figure 6:
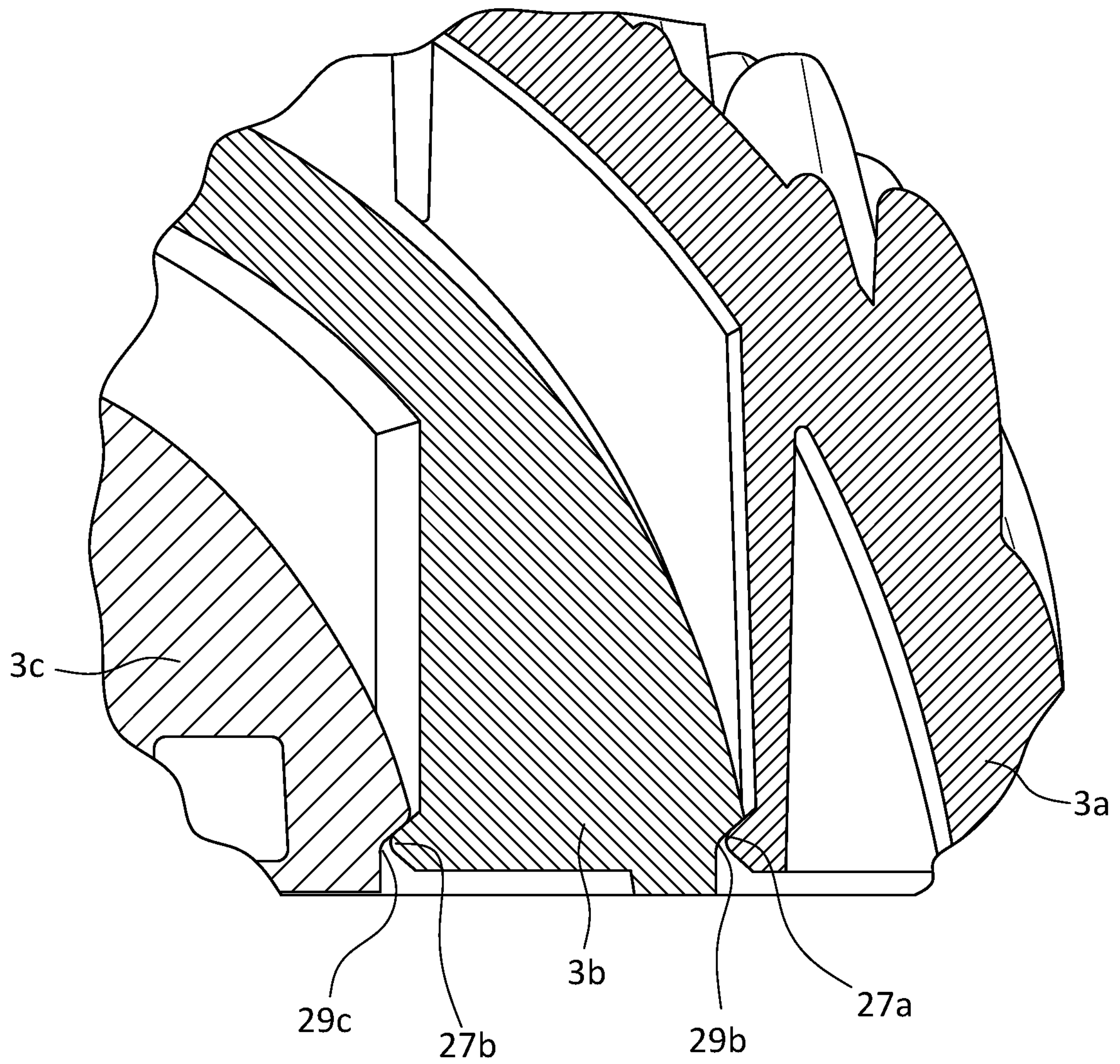
FIG. 6 is a detail view of a portion of a cross section through the assembled three resilient members of FIG. 3 showing engagement formations operating between the members.

With reference again to FIG. 6, adjacent resilient members for example 3*a*, 3*b* and 3*b*, 3*c* include formations for detachable engagement therebetween. The formations include corresponding protrusions 27*a*, 27*b* and recesses 29*b*, 29*c* formed on respective outer and inner peripheries of the adjacent resilient members. Urging the adjacent resilient members into the nested position illustrated in FIG. 6 causes sufficient deformation for the protrusions 27*a*, 27*b* to be received into the recesses 29*b*, 29*c* and thus engaged therein.

Figure 3:
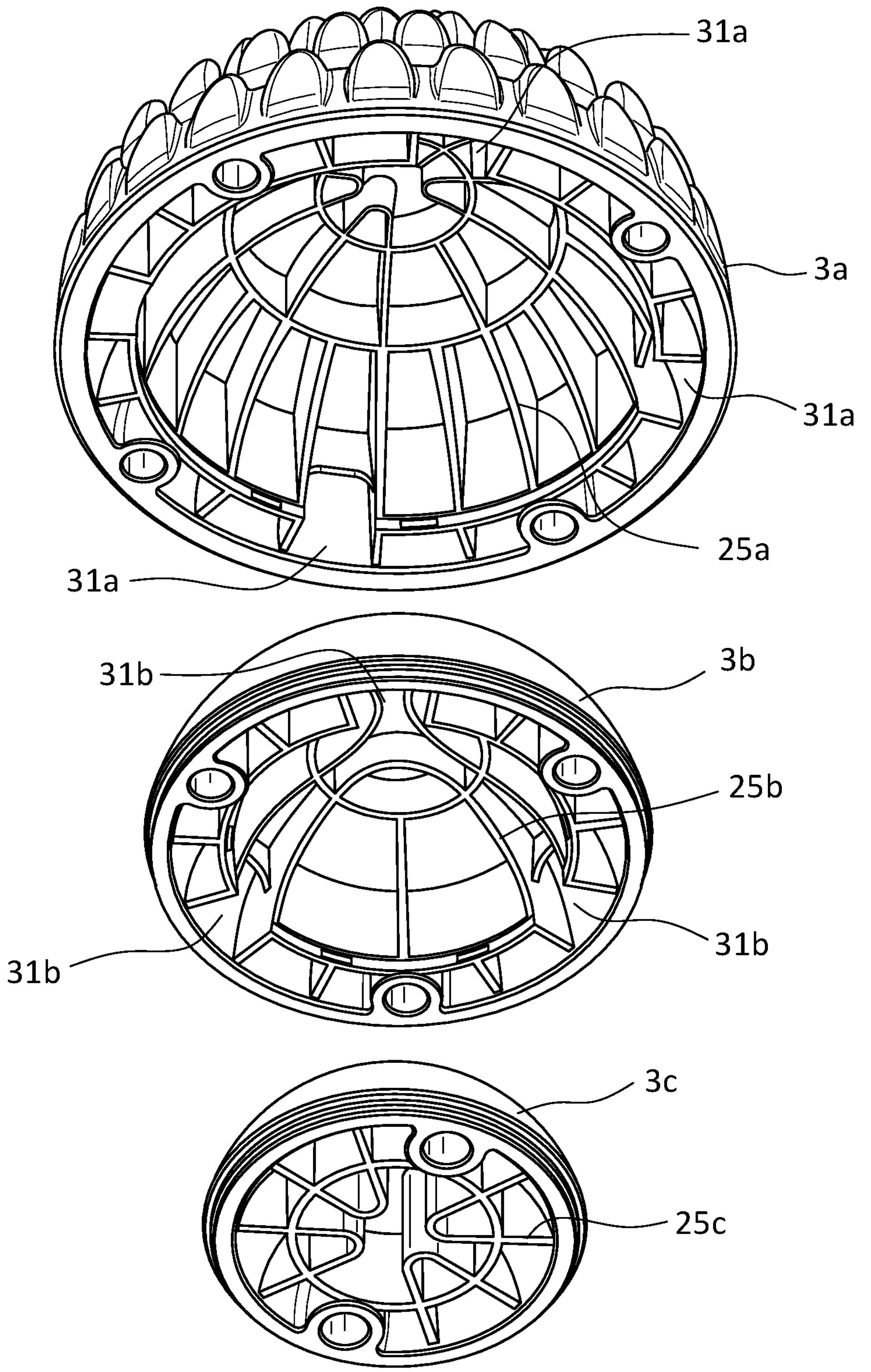
FIG. 3 is an exploded view of the underside of three resilient members of the pressure applicator assembly of FIG. 1.

With reference to FIG. 3, to assist a user to overcome the engagement the ribs are formed with one or more access cut-outs 31*a*, 31*b* so that the user can insert a finger to gain purchase on an inner one of the adjacent resilient members to thereby overcome the engagement force between the protrusions and the undercuts.

For example, the user may insert a thumb in a first access cut-out 31*a* and a finger in a second access cut-out 31*a* to assist in bringing the outermost resilient member 3*a* away from the intermediate resilient member 3*b*.

In use a person takes the pressure applicator assembly 1, in its fully assembled state as shown in FIG. 1 to prepare for use. Depending on the person's requirements the assembly 1 may be used in a number of different modes. For example if the person wishes to reduce the firmness of the outermost resilient member 3*a* of the pressure applicator assembly 1 then either innermost resilient member 3*c*, or both the innermost resilient member 3*c* and the intermediate resilient member 3*b* are removed. Removing or adding the intermediate member and/or the innermost resilient member involves firstly grasping the outermost member 3*a* and then applying sufficient withdrawal force to overcome the attraction of the magnets 9 to galvanised steel plate 13 of the base 15. It will be realised that care is taken in designing the detachable engagement formations so that the engagement force of adjacent resilient members to each other is greater than the attractive force of the magnets to the steel plate 13, since if that is not the case then then innermost resilient member 3*c* and possibly also the intermediate resilient member 3*b* will remain attached to the base 13 whilst the outermost resilient member 3*a* is detached from the base.

Figure 7:
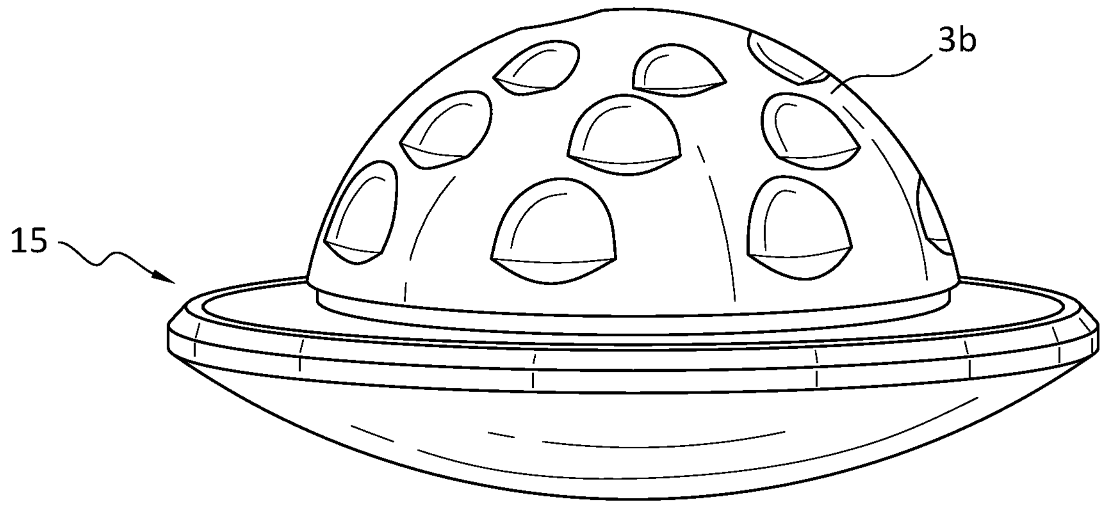
FIG. 7 shows the assembly in a first exemplary configuration for use.

Once one or more of the intermediate and innermost resilient members have been removed then the outermost member, and possibly the intermediate member too in nested formation, can be reattached to the base. Alternatively they can instead be placed on the floor or against a wall if the base, with its rocking functionality is not required. If a smaller radius of curvature is desired, for applying more localised pressure then the outermost resilient member can be removed so that the person can apply more localised pressure using either the intermediate or the innermost resilient member. Typically a person lies or stands so that part of the person's body is brought against the resilient member in use FIGS. 7 to 12 show the use of the assembly in various configurations. In FIG. 7 the intermediate resilient member 3*b* is shown attached to the base 15 with the outermost resilient member 3*a* having been removed. In the configuration shown in FIG. 7 an intermediate curvature is presented for a somewhat localised application of pressure. The innermost resilient member 3*c* may be nested within the intermediate member 3*b* for greater firmness or it may have been removed for reduced firmness.

Figure 8:
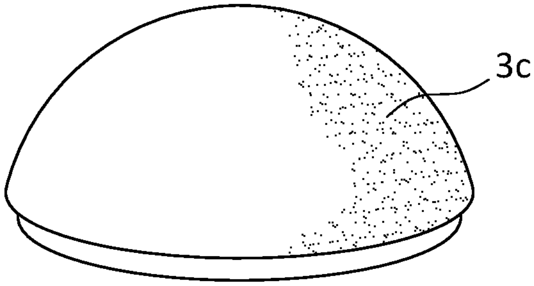
FIG. 8 shows the assembly in a second exemplary configuration for use.

FIG. 8 shows the innermost resilient member being used in isolation. It presents a minimum radius of curvature for most localised application of pressure and is the firmest of the three resilient members in isolation.

Figure 9:
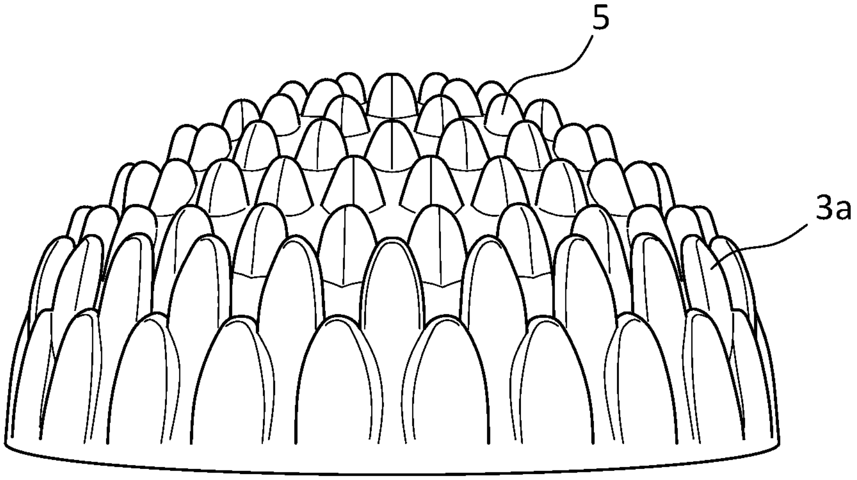
FIG. 9 shows the assembly in a third exemplary configuration for use.

FIG. 9 shows the outermost resilient member 3*a* resting on a surface such as the floor and detached from the base. The outermost resilient member 3*a* in isolation is the least firm of the three resilient members. This configuration presents the greatest radius of curvature for a greater area of application of pressure though due to the projections 5 there are a number of somewhat localised areas of discrete pressure. Both the intermediate 3*b* and innermost 3*c* resilient members may be nested within the outermost resilient member for greatest firmness. Alternatively either just the intermediate member 3*b* may be nested within the outermost resilient member 3*a* for intermediate firmness or neither are nested within the outermost resilient member 3*a* for lowest degree of firmness.

Figure 10:
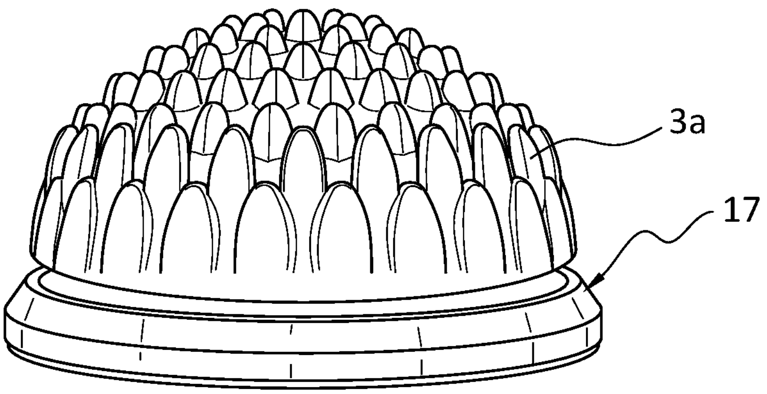
FIG. 10 shows the assembly in a fourth exemplary configuration for use.
Figure 11:
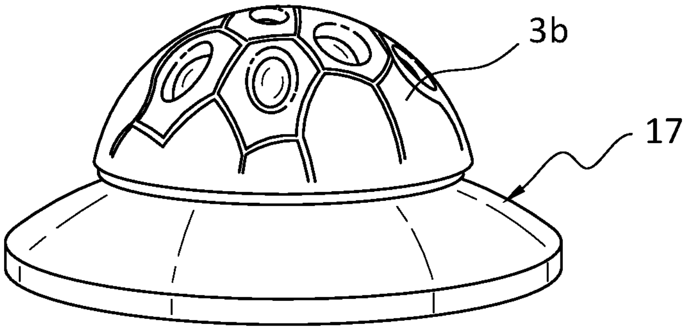
FIG. 11 shows the assembly in a fifth exemplary configuration for use.
Figure 12:
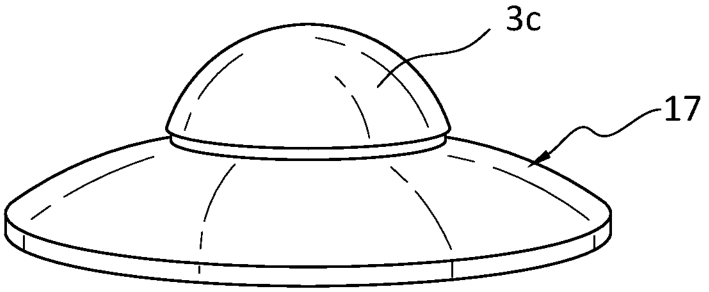
FIG. 12 shows the assembly in a sixth exemplary configuration for use.

FIGS. 10, 11 and 12 show the use of each of the resilient member on the base disk 17 wherein the base disk has been upturned so that it does not tilt.

It will therefore be realised that the pressure applicator assembly of FIG. 1 allows for a range of pressure application and pressure localisation options along with the ability to have a rocker base for directing the applied pressure to the subject if desired. Due to the nesting of the resilient members the degree of firmness and/or the radius of curvature and thus the degree of localisation of application of force can be varied. Furthermore, the apparatus is readily stored and transported since it can be placed into the compact nested configuration that is illustrated in FIG. 1.

Although it is preferred that the resilient nested members are used with the preferred base 15 they might also be used with another magnetically attractive base such as a magnetically attracted metal wall or floor surface or some other object that has a suitable magnetically attracted surface.

Figure 13:
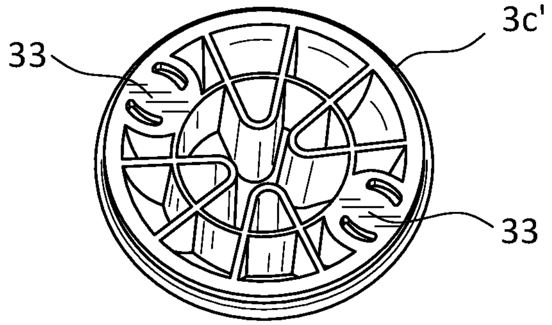
FIG. 13 depicts an underside of a further version of a smallest one of the resilient members showing how its magnets are retained by integrally formed covers.
Figure 14:
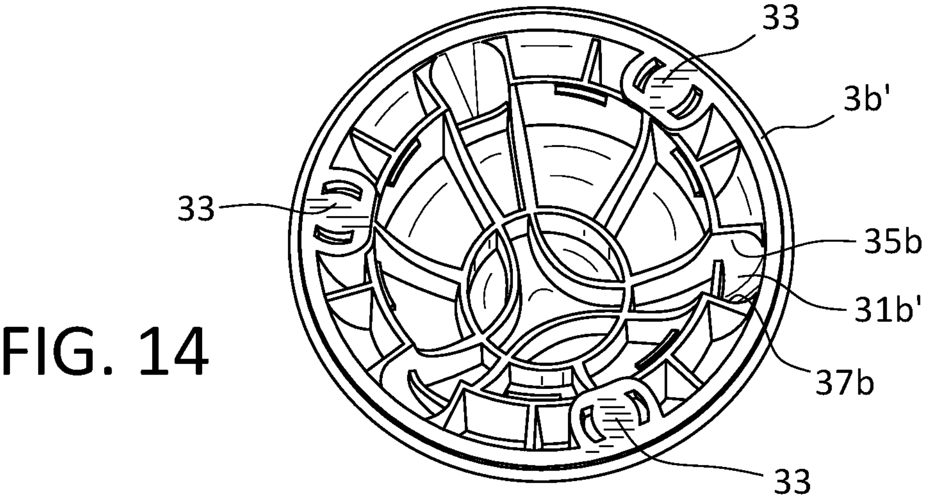
FIG. 14 depicts an underside of a further version of an intermediately sized one of the resilient members showing how its magnets are retained by integrally formed covers.
Figure 15:
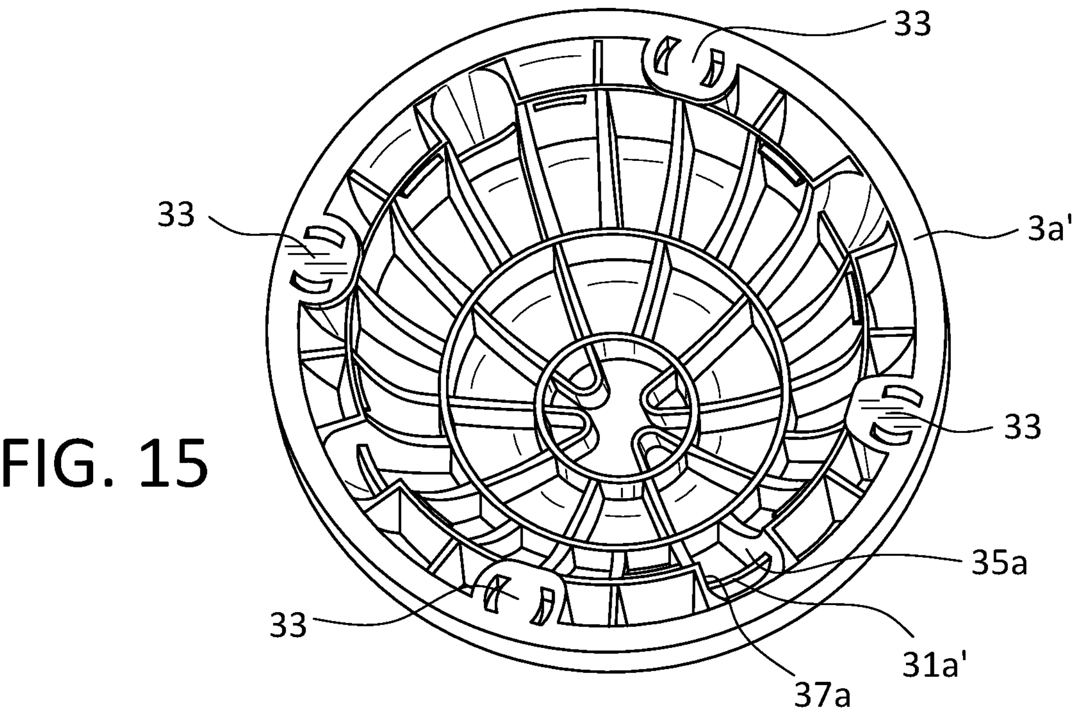
FIG. 15 depicts an underside of a further version of a largest one of the resilient members showing how its magnets are retained by integrally formed covers.

Various embodiments of the invention are possible. For example, FIGS. 13, 14 and 15 are views of the underside of a further embodiment of resilient nested members 3*a*' which is an outermost member, 3*b*' which is an intermediate member and 3*c*' which is an innermost member. The resilient members 3*a*', 3*b*' and 3*c*' differ from the previous versions 3*a*, 3*b*, 3*c* illustrated in FIG. 3 in two ways. Firstly, the resilent members 3*a*', 3*b*' and 3*c*' are moulded with integrally formed magnet covers 33 that cover the pockets in which the disk magnets are located to thereby secure them within. Secondly, opposed sides 35*a*, 37*a*, 35*b*, 37*b*, of each of the access cut-outs 31*a*', 31*b*', of the outermost and intermediate nested members 3*a*' and 3*b*' are arcuate to complement sides of a user's finger so that the finger can be easily and comfortably inserted into the access holes for detaching adjacent resilient members from each other.

Furthermore, although the resilient members are preferably dome-shaped they might be provided in other nestable shapes too.

Other possible embodiments may include variations in the plan size or plan shape of the base. For example a large rectangular plan shape rather than a small circular plan shape may be used. Further embodiments may vary the contours of the base, for example flat, angled, rocker, wobble or multiplaner contours may be provided. Various contours allow the resilient members to be used at differing angles, from horizontal to inclined to vertical. Various contours also allow differing degrees of stability, from fixed in position to unstable.

In the preferred embodiment of the invention that has been discussed the overall wall thickness is 5.5 mm and the outer diameters of the resilient members 3*a*, 3*b*, 3*c* are respectively 120 mm, 90 mm and 60 mm. When nested the resilient members create a planar or near-planar base. The ribs of each resilient member are slightly recessed from its outer periphery to reduce wear of the ribs.

In compliance with the statute, the invention has been described in language more or less specific to structural or methodical features. The term "comprises" and its variations, such as "comprising" and "comprised of" is used throughout in an inclusive sense and not to the exclusion of any additional features. It is to be understood that the invention is not limited to specific features shown or described since the means herein described herein comprises preferred forms of putting the invention into effect. The invention is, therefore, claimed in any of its forms or modifications within the proper scope of the appended claims appropriately interpreted by those skilled in the art.

Throughout the specification and claims (if present), unless the context requires otherwise, the term "substantially" or "about" will be understood to not be limited to the value for the range qualified by the terms.

Any embodiment of the invention is meant to be illustrative only and is not meant to be limiting to the invention. Therefore, it should be appreciated that various other changes and modifications can be made to any embodiment described without departing from the scope of the invention.

The invention claimed is:

1. A pressure applicator assembly, comprising:

a plurality of resilient nested members, each of said plurality of resilient nested members having an outer surface for applying force to a subject, whereby firmness of an outermost surface of the assembly is adjustable by removal or addition of one or more of said plurality of resilient nested members; and wherein each of the plurality of resilient nested members includes one or more magnetic regions for attachment to a base and each of the plurality of resilient nested members is locatable on the base by magnetic attraction between the one or more magnetic regions and one or more magnetically attracted regions of the base, wherein adjacent nested resilient members of the plurality of resilient nested members include formations for detachable engagement therebetween, wherein the formations include corresponding protrusions and recesses formed on respective outer and inner peripheries of the adjacent resilient nested members, whereby urging the adjacent resilient members into a nested position causes sufficient deformation for the protrusions to be received into the recesses, wherein a number of the plurality of resilient nested members have ribs with inner sides that are arcuate and shaped to complement the outer surface of an adjacent resilient nested member, and wherein an engagement force of each of the plurality of resilient nested members to each other is greater than an attractive force of the one or more magnetic regions and the one or more magnetically attracted regions of the base.

2. The assembly according to claim 1, further comprising the base, wherein the one or more magnetically attracted regions of the base comprise one or more regions of ferromagnetic material.

3. The assembly according to claim 2, wherein the one or more regions of ferromagnetic material comprises a steel plate.

4. The assembly according to claim 3, wherein the base comprises a rocker to which the steel plate is adhered.

5. The assembly according to claim 4, wherein the rocker comprises a disk having an inner side to which the steel plate is mounted and a convex outer side for contact against a weight bearing surface.

6. The assembly according to claim 5, wherein the inner side includes a peripheral lip which surrounds the steel plate and which is dimensioned to receive an outer periphery of an outermost one of the plurality of resilient nested members.

7. The assembly according to claim 1, wherein the one or more magnetic regions comprise one or more magnets.

8. The assembly according to claim 7, wherein the one or more magnets are held in corresponding pockets integrally formed in inner sides of each of the plurality of resilient nested members.

9. The assembly according to claim 8, wherein each of the plurality of resilient nested members includes integrally formed covers for the pockets.

10. The assembly according to claim 1, wherein each of the plurality of resilient nested members gas an inner side that is reinforced.

11. The assembly according to claim 10, wherein the inner side of each of the plurality of resilient nested members is reinforced by the ribs.

12. The assembly according to claim 11, wherein each of the plurality of resilient nested members is dome shaped.

13. The assembly according to claim 1, wherein the ribs are formed with one or more access cut-outs for assisting a user to gain purchase with a finger on an inner one of the adjacent resilient members to thereby overcome engagement force between the protrusions and recesses.

14. The assembly according to claim 13, wherein opposed sides of the one or more access cut-outs are arcuate to complement sides of a finger.

15. The assembly according to claim 1, wherein each of the plurality of resilient nested members has a height that is 90% of a radius of the base of the same resilient nested member.

16. The assembly according to claim 1, wherein the plurality of resilient nested members comprise an inner nested member, an intermediate nested member and an outer nested member.

17. The assembly according to claim 1, wherein each of the plurality of resilient nested members, other than an innermost one, has said ribs with inner sides that are arcuate and concentric with the outer surface of the same resilient nested member.

18. The assembly according to claim 17, wherein outer sides of non-outermost resilient members abut inner sides of the ribs of the next outermost member to thereby increase the firmness of the next outer member.

19. A pressure applicator assembly, comprising:

a plurality of resilient nested members, each of said plurality of resilient nested members having an outer surface for applying force to a subject, whereby firmness of an outermost surface of the assembly is adjustable by removal or addition of one or more of said plurality of resilient nested members; and wherein each of the plurality of resilient nested members includes one or more magnetic regions for attachment to a base and each of the plurality of resilient nested members is locatable on the base by magnetic attraction between the one or more magnetic regions and one or more magnetically attracted regions of the base, wherein adjacent resilient nested members of the plurality of resilient nested members include formations for detachable engagement therebetween, wherein the formations include corresponding protrusions and recesses formed on respective outer and inner peripheries of the adjacent resilient nested members, whereby urging the adjacent resilient nested members into a nested position causes sufficient deformation for the protrusions to be received into the recesses, wherein each of the plurality of resilient nested members, other than an innermost one, has ribs with inner sides that are arcuate and shaped to complement the outer surface of an adjacent resilient member, wherein outer sides of non-outermost resilient nested members abut inner sides of ribs of the next outermost member to thereby increase the firmness of the next outer resilient nested member, and wherein an engagement force of each of the plurality of resilient nested members to each other is greater than an attractive force of the one or more magnetic regions and the one or more magnetically attracted regions of the base.

20. The assembly according to claim 19, wherein the ribs are formed with one or more access cut-outs for assisting a user to gain purchase with a finger on an inner one of the adjacent resilient nested members to thereby overcome engagement force between the protrusions and recesses.

* * * * *